May 8, 1928. 1,668,720
M. JELALIAN
COMBINED DIRIGIBLE AIRSHIP AND NONSINKABLE SAILING VESSEL
FOR PASSENGER SERVICE
Filed Nov. 19, 1926 6 Sheets-Sheet 1

Witnesses:
James Torosian
Sarkis Shamirian

Inventor:
Martin Jelalian

May 8, 1928. 1,668,720
M. JELALIAN
COMBINED DIRIGIBLE AIRSHIP AND NONSINKABLE SAILING VESSEL
FOR PASSENGER SERVICE
Filed Nov. 19, 1926    6 Sheets-Sheet 6

Witnesses:
James Torosian
Sarkis Shamirian

Inventor:
Martin Jelalian

Patented May 8, 1928.

UNITED STATES PATENT OFFICE.

1,668,720

MARTIN JELALIAN, OF PROVIDENCE, RHODE ISLAND.

COMBINED DIRIGIBLE AIRSHIP AND NONSINKABLE SAILING VESSEL FOR PASSENGER SERVICE.

Application filed November 19, 1926. Serial No. 149,545.

The object of the invention is to provide a combined dirigible and non-sinkable sailing vessel designed to travel on land and water, especially on water, to serve as a combined air-craft and sailing vessel for passenger service to travel a considerable long distance. The craft is provided with a series of propellers and wings to propel the same forward with a great amount of speed and afford the latter an unusual amount of lifting capacity with its central and side assistant gas-balloons.

The detailed description of the invention is illustrated in the accompanying six sheets of drawings forming a part of this specification in which.

Referring to the drawings —$a$— designates a ship which may be buoyantly constructed and provided with a light equipment for driving the same forward on water in the usual manner.

Mounted above said ship —$a$— upon a series of vertical supports —$a^2$, $a^2$— is a frame —$a^1$— which extends longitudinally to the ship —$a$—. Said frame —$a^1$— comprises a series of transversely extending connecting supports —$e^2$, $e^2$— a wire netting —$a^6$— and a layer of canvas —$e^{10}$— designed to serve as a plane.

A strip or layer of fine tin —$f^3$— is secured upon the bottom of said plane and extends centrally and longitudinally to the latter.

The frame —$a^1$— is provided with flanges or lateral projections —$a^9$, $a^9$— which extend outwardly from each side thereof and each of said flanges —$a^9$, $a^9$— comprises a series of connecting supports, a fine wire netting and a layer of canvas in the same manner as frame —$a^1$— in order to provide a large disposed surface with the latter to serve as a plane for the craft.

The ship —$a$— is also provided with a series of main connecting supports, —$e$, $e$,— extending obliquely centrally upon the bottom of each of the said flanges or lateral projections —$a^9$, $a^9$—.

Secured upon the top of the frame —$a^1$— and extending longitudinally to the same is a main gas-balloon inclosing frame supporting guard frame —$e^9$— which supports the main gas-bag inclosing frame —$a^3$— and said guard frame —$e^9$— comprises longitudinally extending supports —$p^3$— and transversely arranged connecting supports —$p^1$, $p^1$— and also connecting wires —$p$, $p$— and a layer of canvas secured to the same.

Secured upon the top of the outwardly extending lateral projections —$a^9$, $a^9$— are smaller gas balloon inclosing frame supporting guard frames —$r^3$, $r^3$— which extend centrally and longitudinally to the said lateral projections —$a^9$, $a^9$— each side of the main central gas bag inclosing frame $a^3$ and support side assistant gas-bag enclosing frames —$a^5$, $a^5$—. Each of the smaller gas-bag enclosing frame supporting guard frames comprises longitudinally and transversely extending supports —$p^9$ and $p^5$— and also connecting wires —$p^8$— and a layer of canvas —$r^3$— in the same manner as the guard frame —$e^9$— of the main gas-balloon inclosing frame —$a^3$—.

Figure 4:
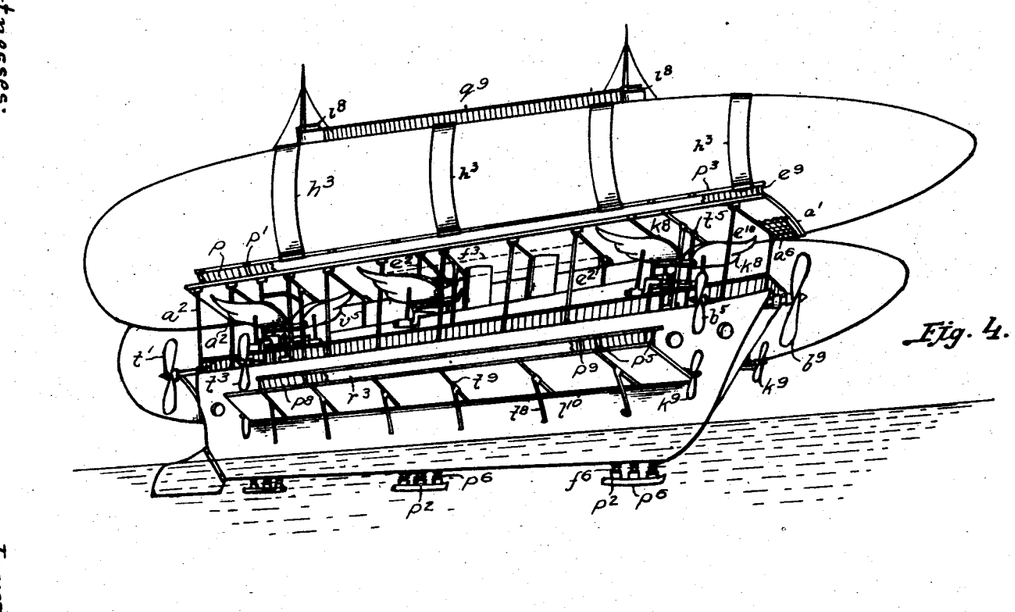
Fig. 4 is a side perspective view showing the side assistant gas-bag inclosing frames as arranged upon the top of the planes projecting from the sides of the ship with one of the side assistant gas-bag inclosing frames and the hydro-aero-planes beneath said side-projecting planes omitted.

The side assistant gas-bag inclosing frames —$a^5$, $a^5$— may be secured upon the top of the planes —$l^{10}$, $l^{10}$— projecting outwardly from each side of the ship —$a$— in the manner as shown in Fig. 4.

Secured upon the top of the forward and the rear ends of the lateral projections —$a^9$, $a^9$— centrally between the main gas-bag inclosing frame —$a^3$— and side assistant gas-balloon inclosing frames —$a^5$, $a^5$— are motors —$f^9$, $f^9$— each driving a propeller —$h^9$; and also located beneath said outwardly extending lateral projections —$a^9$, $a^9$ are hydro-aero-planes —$e^5$, $e^5$— arranged in pairs located forwardly and rearwardly each side of the ship —$a$—.

Main vertical supports —$e^3$ $e^3$— are also provided with a series of horizontally arranged connecting supports —$r$, $r$,— and said main supports extend vertically from the body sections of each pair of said hydro-aero planes centrally upon the bottom of the outwardly extending lateral projections —$a^9$ $a^9$— of the frame —$a^1$— and connected thereto.

The main supports —$e^3$ $e^3$— pass through said lateral projections $a^9$ $a^9$ and project obliquely upwardly through spaces formed between the adjacent compartments of the gas-balloons —$f^5$, $f^5$— of the gas-bag inclosing frame —$a^5$—. The main supports $e^3$, $e^3$ project centrally to each side of the main gas-balloon inclosing frame —$a^3$— opposite to the space —$o^3$— formed between the adjacent compartments of the same and having connecting strips —$r^9$, $r^9$— projecting through said space and connecting said supports —$e^3$, $e^3$— of each pair of opposite adjacent hydro-aero planes —$e^5$, $e^5$— together which are located forwardly and rearwardly each side of the ship —$a$—, as shown in Figures 1, 2, 3 and 5.

The gas-bag inclosing frame —$a^3$— which is provided with an outer layer —$h^2$— is divided into three compartments having gas-bags $f^2$, $f^3$ and $f^8$ detachably secured within the compartments and adapted to fill out the same. Narrow spaces —$o^3$, $o^3$— are arranged between the adjacent compartments which are provided with transversely extending fixed platforms —$o^9$, $o^9$— supporting cylindrical water tanks —$o^8$, $o^8$— having water pipe connections —$q^3$, $q^3$— projecting outwardly from said gas-bag inclosing frame —$a^3$— through the openings —$q^1$, $q^1$— and extending into the transverse gang ways —$k^2$, $k^2$— arranged between the said gas-bag inclosing frame —$a^3$— and smaller side assistant gas-balloon inclosing frames —$a^5$, $a^5$—.

A gang-way $q^9$ is arranged upon the top of the said main gas-bag inclosing frame —$a^3$— which extends centrally and longitudinally of the same and said gang-way is secured to the vertical supports —$n^{10}$, $n^{10}$— projecting upwardly from the gas-bag enclosing frame —$a^3$—. The gang-way $q^9$ is provided with fixed seats —$c^3$, $c^3$ for observation purposes.

A longitudinally extending gang-way —$q^5$— is also arranged centrally upon the top of each of said smaller side assistant gas-balloon enclosing frames which are also provided with fixed seats —$c^3$, $c^3$— located at the rear and the forward ends thereof for observation purposes.

Figure 1:
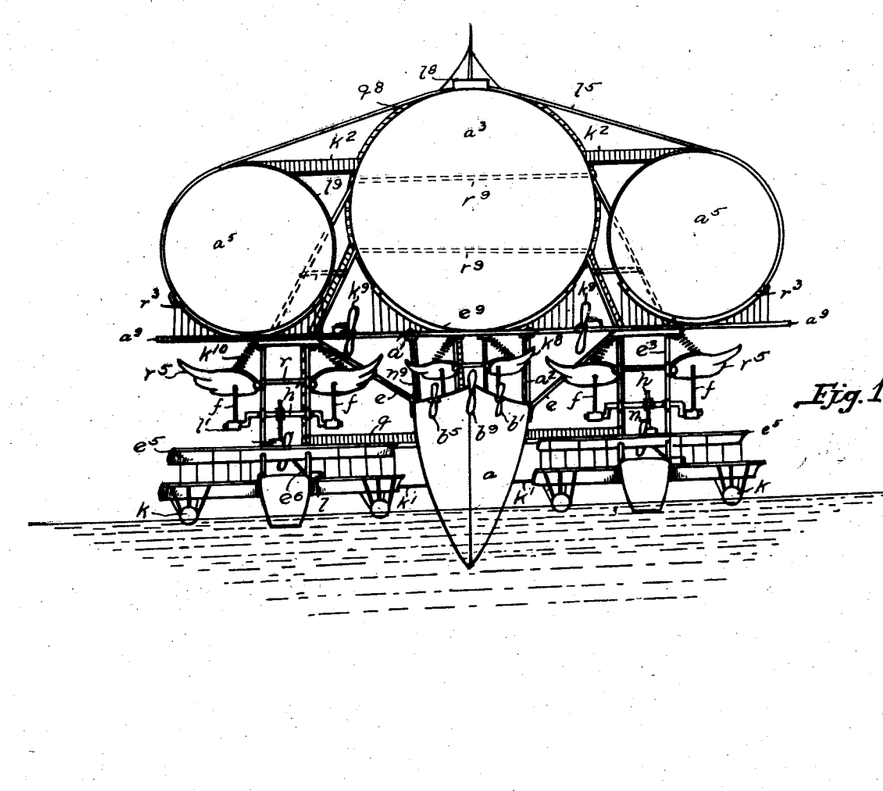
Fig. 1 is a front elevation illustrating two of its forwardly side hydroaero-planes as relative to the ship and the gas-bag inclosing frames.
Figure 2:
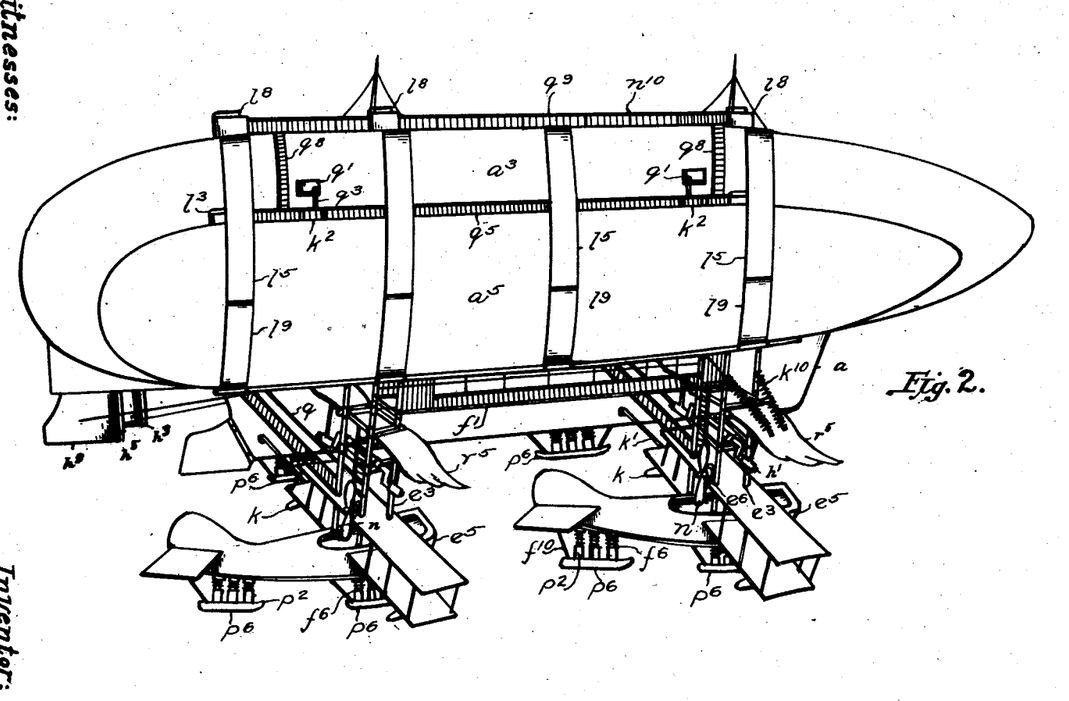
Fig. 2 is a side perspective view showing a pair of its side hydro-aero-planes as in connection with the ship.
Figure 3:
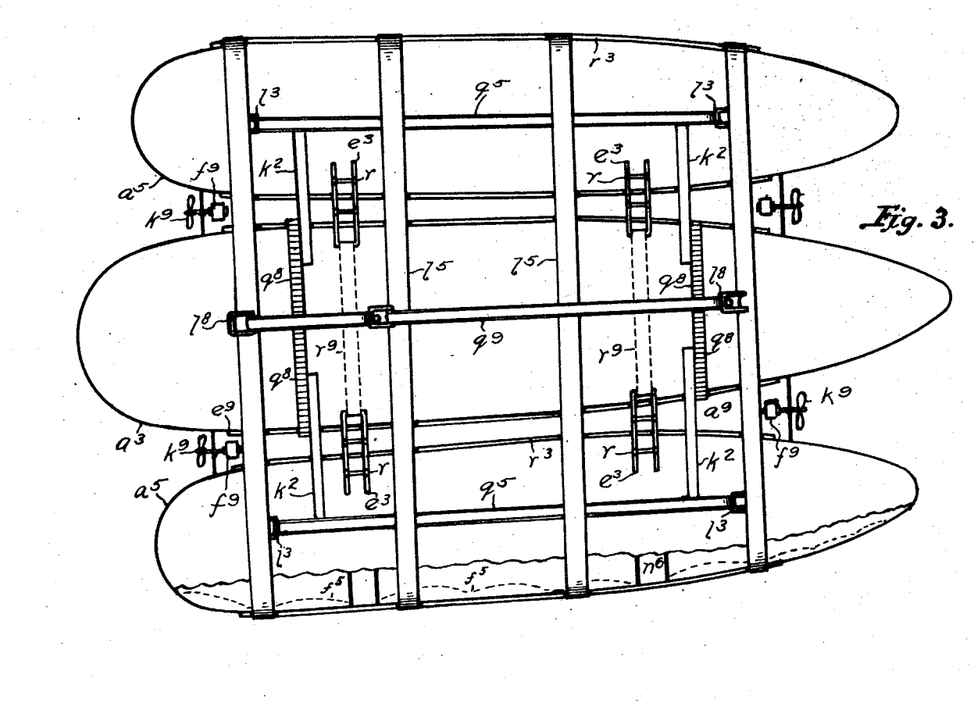
Fig. 3 is a top plan view showing the connections of the gas-bag inclosing frames and the hydro-aero-planes.
Figures 5, 6, 7:
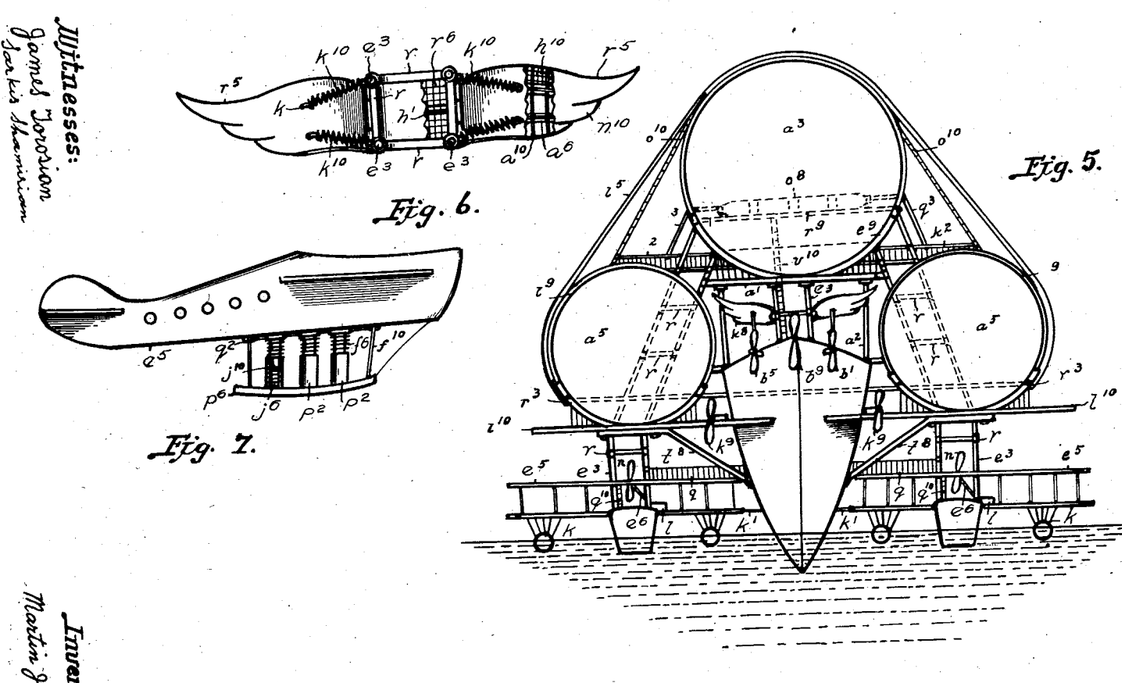
Fig. 5 is a front elevation of Fig. 4 provided with its side assistant gas-bag inclosing frame.
Fig. 6 is a top detail view of the winged device.
Fig. 7 is an enlarged side detail view of the spring-cushion landing device.
Figure 8:
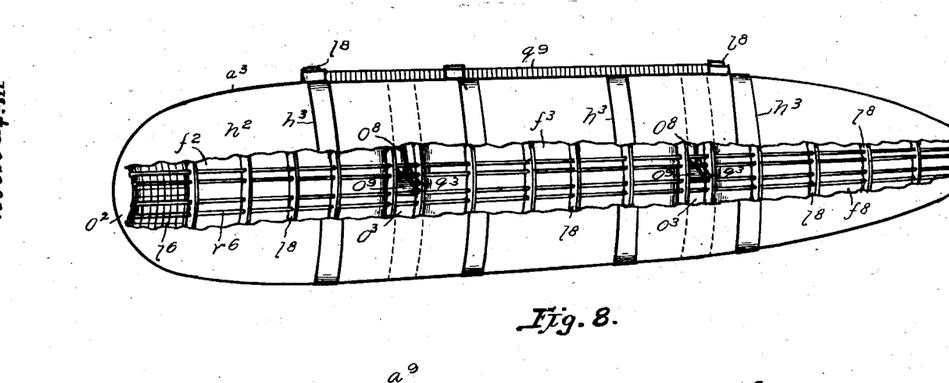
Fig. 8 illustrates the side prospective elevation of the main central gas-bag inclosing frame with its outer layer as partly removed and showing its detailed inner construction.

A transverse wire gang-way —$q$— is secured to and extends from the top of the plane of each adjacent opposite pair of the said hydro-aero-planes —$e^5$, $e^5$— into the ship —$a$— as shown in Figures 2, 4 and 5.

The hydro-aeroplanes —$e^5$, $e^5$— are also provided with connecting bars —$h^1$, $h^1$— extending from the bottom planes thereof into the ship —$a$— beneath the gangways —$q$—$q$—. Gangways —$f^1$ $f^1$— are arranged between the adjacent side hydro-aero-planes —$e^5$ $e^5$— beneath the lateral projections —$a^9$ $a^9$ which extend longitudinally to the same and have their ends connected to the same —$e^3$, $e^3$ of the said hydro-main supports —$e^3$, $e^3$ of the said hydro-aero planes —$e^5$ $e^5$ which are located forwardly and rearwardly each side of the ship —$a$— and also having connecting wires extending vertically upon the bottom of the said outwardly extending lateral projections —$a^9$, $a^9$ and attached thereto.

Ladders —$q^8$, $q^8$— extend from each side of the main gas-bag inclosing frame —$a^3$ into the gangway $q^9$— arranged centrally and longitudinally upon the top of the said gas-bag inclosing frame —$a^3$ and also ladders $o^{10}$ $o^{10}$, projecting from the ends of the gang-ways —$k^2$, $k^2$, into the said gang-way —$q^9$.

Ladders —$v^{10}$— also extend centrally from the ship —$a$— into the fixed platforms —$o^9$ $o^9$— arranged between the adjacent compartments of the gas-bag inclosing frame —$a^3$—. Side ladders —$n^9$, $n^9$— extend from said ship —$a$— to the top of the plane —$a^1$— and also ladders —$j^5$ $j^5$— from the body section of the hydro-aero planes —$e^5$, $e^5$ which project through the openings —$j^9$ $j^9$ and extend vertically to the top of the outwardly extending lateral projections —$a^9$, $a^9$.

The gas-bag inclosing frame —$a^3$— which is provided with an outer layer —$h^2$ comprises a series of rings —$l^8$, $l^8$— having tubular rods —$r^6$ $r^6$ connected to and projecting through the same and extending longitudinally to said frame —$a^3$— and have their ends connected to the small circular supports —$o^2$— and $o^5$— and a wire netting —$c^6$— secured to the latter.

The side assistant gas-bag enclosing frames —$a^5$ $a^5$— are constructed in the same manner as the main gas-bag inclosing frame —$a^3$— with the exception that the platforms and water-tanks within the spaces of the adjacent compartments are omitted.

Thus it will make obvious that if the ship —$a$— is met into collision with an obstacle the same can not be sunk as the arrangement of the central gas-bag enclosing frame —$a^3$— with its side assistant gas-bag inclosing frames —$a^5$ $a^5$— and the arrangement of the propellers and wings with its side hydro-aero-planes will prevent the same from sinking.

Located centrally upon the top plane of each of said hydro-aero-planes —$e^5$ $e^5$— is a motor —$j^1$— which drives crank wing shaft —$h^1$— by chain connection —$h$— passing over sprocket wheel —$h^8$—. Said crank wing-shaft —$h^1$— extends transversely above each of the hydro-aeroplane —$e^5$— and is secured upon the connecting supports —$r$, $r$— surrounding the main vertical supports —$e^3$, $e^3$, and also pivotally connected to the supports —$r$, $r$— above said shaft —$h^1$— are a pair of vertically reciprocating wings —$r^5$, $r^5$— which surround the main vertical supports —$e^3$ $e^3$—; pivotally connected to the upper supports —$r$, $r$ above said shaft —$h^1$— are vertically reciprocating wings —$r^5$, $r^5$.

Extending longitudinally beneath each of said wings —$r^5$ $r^5$— is a flat rectangular support —$j^2$— provided with a series of wing supports —$j^3$ $j^3$— having one of their ends pivotally connected thereto and the other ends hingedly united to the main wing supports —$a^6$ $a^6$— which extend longitudinally to the wings —$r^5$ $r^5$.

A wing-supporting arm —$f$— for each of said wings —$r^5$, $r^5$— having its upper end pivotally connected centrally upon the bottom of said flat rectangular support —$j^2$— and provided with an integral eyelet —$l^1$— at its lower end and loosely mounted upon the end portion of the crank wing-shaft —$h^1$— and a threaded collar secured at each end portion of said shaft —$h^1$— to keep said integral eyelet —$l^1$— in its normal point.

Extending above said wings —$r^5$ $r^5$ are coil-springs —$k^{10}$ $k^{10}$— arranged in pairs having one of their ends connected to the main supports —$e^3$ $e^3$ and the other ends attached to the hooks $k^6$ $k^6$ integral with the main wing-supports —$a^6$ $a^6$ and said main wing supports are provided with a series of transversely arranged connecting supports —$a^{10}$— and a wire netting —$h^{10}$— and a layer of canvas —$n^{10}$— secured to the same. A wire netting —$r^6$ is also secured within the main vertical supports —$e^3$ $e^3$— and its connecting supports —$r$ $r$— between the wings —$r^5$ $r^5$— and a layer of canvas secured to the said netting to serve as a platform for the gangway —$f^1$— as shown in Fig. 6.

Mounted forwardly at the fore end of the ship —$a$— is a revolving propeller —$b^9$— provided with an integral shaft —$v^1$— and a chain connection —$v^6$ at its rear end with motor —$v^9$. Located rearwardly to said shaft —$v^1$ upon each side of the ship —$a$— are revolving propellers $b^5$ and $b^1$. Propeller $b^5$ driven by motor —$v^2$— having chain connections —$m^3$— with the propeller shaft —$m^5$, and the propeller —$b^1$— driven by motor —$v^3$— provided with chain connection —$m^8$— with the propeller shaft —$m^9$—. Located rearwardly to said motors —$v^2$— and —$v^3$— are vertically reciprocating wings —$k^8$ $k^8$— provided with a crank wing shaft —$h^1$ and chain connection —$v^8$— with motor shaft —$v^5$—. The crank shaft —$h^1$— which extends longitudinally beneath the wings $k^8$ $k^8$ is mounted upon connecting supports —$r$, $r$— of the main vertical supports —$r^5$, $r^5$— which extend from the ship vertically to the bottom of the frame —$a^1$— and connected to the transverse supports —$e^2$ $e^2$. Said wings are pivotally connected to the supports —$r$, —$r$ and having pull spring connections, wing supports, wire netting and canvas in the same manner as the wings —$r^5$, $r^5$— of the hydro-aero-planes —$e^5$—.

Mounted at the rear end of the ship —$a$— is a revolving propeller —$t^1$— and located forwardly to the said propeller —$t^1$— upon each side of the said ship —$a$— are revolving propellers —$t^3$, $t^3$; and also extending forwardly to the said propellers —$t^3$, $t^3$— are wings —$v^5$, $v^5$— all of the said propellers and wings are arranged and driven in the same manner as the propellers and wings of the forward end of the ship —$a$— as described.

The main gas-bag inclosing frame —$a^3$— is provided with lateral integral guard strips —$n^3$, $n^3$— having their ends secured to the longitudinally extending supports —$p^3$, $p^3$—. The side assistant gas-bag enclosing frames are also provided with integral guard strips —$l^9$, $l^9$— which are connected to the longitudinally extending supports of the gas-bag inclosing frame supporting guard frames —$r^3$, $r^3$—.

Lateral connecting strips —$l^5$, $l^5$— extending from one of the side assistant gas-bag inclosing frames —$a^5$, $a^5$— and passing over the top of the main gas-bag inclosing frame —$a^3$— and projecting to the other side assistant gas-bag inclosing frame and connected thereto.

In Fig. 5 is shown the lateral connecting strips —$l^5$, $l^5$— as passing through the smaller gas-bag inclosing frame supporting guard wire frames —$t^3$, $t^3$— and the ship —$a$—.

Also located centrally and extending transversely to said ship —$a$— are a pair of vertically reciprocating wings —$q^0$, $q^0$— which are arranged in the same manner as the wings $k^8$ and $v^5$ which are located at the forward and the rear ends of said ship —$a$—.

Located at the rear upon the bottom of the main gas-bag enclosing frame —$a^3$— are a pair of manually operating flat vertical rudders —$h^9$, $h^9$— which are pivotally connected to the supports —$h^5$, $h^5$— projecting downwardly from the bottom of the main gas-bag enclosing frame —$a^3$— and are operated in the usual manner with the rudder of the ship —$a$—.

In Fig. 7 is shown a detail view of a spring cushion landing device for the hydro-aeroplanes —$e^5$, $e^5$— which are also applied to the ship —$a$— as shown in Figures 2 and 4. Said cushion device comprises a tubular member —$p^6$— provided with integral tubes —$p^2$, $p^2$— enclosing coil-springs —$j^6$— and loosely mounted upon the integral slidable shafts —$j^{10}$, $j^{10}$— of the support member —$q^2$— which is secured longitudinally upon the bottom of the body sections of the hydro-aeroplanes —$e^5$, $e^5$— and also the ship —$a$— and having integral eyelets at each end thereof to receive straps —$f^{10}$, $f^{10}$—.

Coil-springs —$f^6$, $f^6$— surround said shafts —$j^{10}$, $j^{10}$— and have one of their ends secured to the end portions of the tubular members —$p^2$, $p^2$— and the other ends connected to the integral collars of the support member —$q^2$—.

Figures 9, 10:
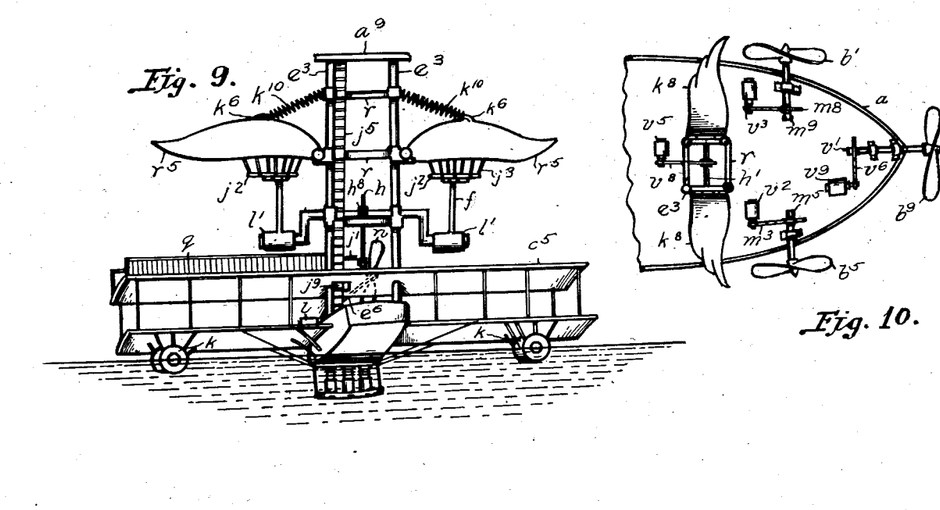
Fig. 9 is a front elevational detail view of one of the side hydro-aero-planes.
Fig. 10 is a top plan view of the forward portion of the ship.

In Fig. 9 is shown the coil-spring cushion device as arranged transversely upon the bottom of the body section of one of the hydro-aeroplanes located beneath the lateral projections —$a^9$—.

Thus having described the invention what I claim as new and desire to secure by Letters Patent is:

1. In a combined dirigible and sailing ship a main central gas-bag inclosing frame having two smaller assistant gas-bag enclosing frames arranged longitudinally and extending each side thereof, a flat frame mounted above said ship upon a series of vertical supports, a guard supporting frame secured to and extending centrally and longitudinally upon the top of said flat frame and adapted to receive said main gas-bag inclosing frame therein, a lateral outwardly extending projection from each side of said flat frame and having smaller gas-bag enclosing frames supported upon the same and each of the same secured within a supporting guard frame connected to and extending longitudinally upon the top of the said lateral projections, a pair of hydro-aeroplanes supported beneath each of said lateral projections and located forwardly and rearwardly to said ship and rigidly connected thereto.

2. In a combined dirigible and sailing ship having gas-bag inclosing frames supported upon a flat frame mounted above said ship upon a series of vertical supports and outwardly extending lateral side projections of the same and each secured within a guard supporting wire frame extending longitudinally upon the top of said flat frame and outwardly extending lateral projections of the same, a pair of hydro-aeroplanes located beneath each of the said lateral projections of said frame and each of the same having a series of main vertical supports provided with connecting support members extending from the body sections of each pair of said hydro-aeroplanes centrally upon the bottom of the outwardly extending lateral projections of said flat frame and connected thereto and said supports passing through the said lateral projections and supporting guard wire frames and projecting upwardly in an oblique position through the spaces formed between the adjacent compartments of the gas-balloons of the said gas-bag inclosing frames located upon said lateral projections of the said frame and having a pair of main connecting strips passing through the spaces formed between the adjacent compartments of a main gas-bag enclosing frame supported centrally upon said flat frame and located within a guard frame.

3. In a combined dirigible and sailing ship a main central gas-bag enclosing frame having two smaller side assistant gas-bag enclosing frames arranged longitudinally and extending each side thereof and supported upon lateral projections and located within guard wire frames, and said main central gas-bag enclosing frame, supported upon a flat frame above said ship and located within a main guard wire frame extending longitudinally and centrally upon the top of said flat frame and divided into plurality of compartments, each compartment containing a gas bag detachably secured within the compartment and adapted to fill out the same; a narrow space between each adjacent compartment and having a cylindrical water tank located upon a fixed platform extending longitudinally within each of said spaces and provided with water pipe connections projecting through each side of said main gas-bag enclosing frame into a fixed gang-way arranged transversely between the said main gas-bag enclosing frame and its side assistant gas-balloon enclosing frames.

4. In a combined dirigible and sailing ship a main central gas-bag enclosing frame having two smaller side assistant gas-balloon enclosing frames each divided into three compartments and having spaces arranged between the adjacent compartments of the same and said side assistant gas-balloon enclosing frames supported upon outwardly extending lateral projections of a flat fixed frame mounted above said ship which support said central main gas-bag enclosing frame, and said frame comprising a series of transversely arranged connecting supports a wire netting and a layer of canvas, a strip of layer of a tin secured to and extending centrally and longitudinally upon the bottom of said flat frame, a revolving propeller at the forward end of said ship, two revolving propellers rearwardly to the said propeller and located one on each side of said ship, a pair of vertically reciprocating wings above said ship between said side propellers and having main vertical supports provided with a series of connecting supports secured centrally upon the top of said ship and extending vertically to the bottom of said frame and secured thereto, a similar form arranged propellers and wings in the rear of said ship and also a pair of vertically reciprocating wings arranged centrally to said ship and extending transversely thereof, and all of said propellers and wings having located beneath said flat frame forming a plane above said ship.

5. In a combined dirigible and sailing ship a main central gas-bag enclosing frame having two smaller side assistant gas-balloon enclosing frames located one on each side and extending longitudinally to the same and said assistant gas-balloon inclosing frames, supported upon lateral projections extending outwardly from the sides of a main flat frame mounted above said ship upon a series of vertical supports, a pair of hydro-aeroplanes supported beneath said lateral projections of said main flat frame and located forwardly and rearwardly upon each side of said ship, and having main vertical supports provided with a series of connecting supports extending vertically to the bottom of said lateral outwardly extending projections, a pair of vertically reciprocating wings for each of said hydro-aeroplanes and located centrally beneath said lateral projections and having their inner ends pivotally connected to said connecting supports centrally above the top plane of each of said hydro-aeroplanes, a crank shaft extending longitudinally beneath each pair of said wings and mounted upon said connecting supports, a wing supporting arm located centrally beneath each of said wings having its upper end pivotally connected upon the bottom of a flat rectangular support extending longitudinally beneath the same and the lower end provided with an integral eyelet and loosely mounted upon the end portion of said crank wing-shaft, a series of wing supports for said flat rectangular support having one of their ends hingedly connected to the same and the other ends pivotally united to a pair of main wing supports extending longitudinally to each of said wings, transversely arranged wing-supports passing through said main wing supports and having wire netting applied to the same and a layer of canvas secured to the netting, integral hooks arranged upon the top of the said longitudinally extending main wing supports and having a pair of pull spring connections attached to the same and extending vertically to the said main vertical supports of each of the said hydro-aeroplanes and connected thereto.

6. In a combined dirigible and sailing ship a main gas-bag inclosing frame having two smaller side assistant gas-balloon inclosing frames extending longitudinally one on each side of the same and supported upon lateral projections extending outwardly from the sides of a main flat frame mounted above said ship upon a series of vertical supports and adapted to serve as a plane, two revolving propellers forwardly above said ship and each located centrally between the said main and side assistant gas-balloon inclosing frames, a pair of motors located upon the top of the forward end of said main flat plane centrally between said gas-bag inclosing frames and adapted to drive said propellers, a pair of similarly arranged propellers at the rear end of said plane, ladders extending from the forward and the rear of said ship and projecting through said main frame and thence extending vertically through the spaces formed between the adjacent compartment of said main gas-bag inclosing frame and projecting into fixed platforms, and gang-ways extending longitudinally upon the top of said gas-bag inclosing frames and having observation seats arranged within the same.

7. In a combined dirigible and sailing ship a main gas-bag inclosing frame having a smaller side assistant gas-balloon inclosing frames located one on each side of the same, and said main and each of said smaller side assistant gas-bag inclosing frame divided into three compartments and each compartment containing a gas-bag detachably secured within the same, and each of said frames consisting of a series of flat vertically arranged circular rings located transversely to the said frames and provided with equi-spaced perforations arranged in pairs and encircling said rings, a series of tubular rods extending longitudinally to said frames and projecting through said perforations, a wire netting applied to each of said frames and an outer layer of canvas secured to the same, a series of integral strips for said main and each of said side assistant gas-bag enclosing frames and having their ends connected to a longitudinally extending support of gas-bag enclosing frame guard wire frames arranged longitudinally upon a flat frame located above said ship and lateral outwardly extending projections of the same, and also a series of connecting strips projecting upwardly from one of the side assistant gas-bag enclosing frames and passing over said central main gas-bag enclosing frame and connected to the opposite side assistant gas-balloon enclosing member.

8. In a combined dirigible and sailing vessel a main central gas-bag enclosing frame having two smaller assistant gas-bag enclosing frames arranged longitudinally one on each side of the same, a flat frame mounted above said ship upon a series of vertical supports and supporting said main gas-bag enclosing frame located within a fixed guard wire frame extending longitudinally upon said flat frame and said side assistant gas-bag enclosing frames extending longitudinally upon the top of outwardly extending lateral projections of said flat frame and each secured within a smaller fixed guard frame, a pair of hydro-aeroplanes supported beneath each of the side lateral projections of said flat frame and located forwardly and rearwardly upon each side of said ship, a winged device for each of said hydro-aeroplanes and located beneath said lateral outwardly extending projections of said flat frame, a longitudinally extending gang way between the forward and the rear hydro-aeroplanes and having connecting wires extending vertically to the bottom of said lateral projections and said gang way having bottom of the same and connected to the main vertical supports of said hydro-aeroplanes and a coil spring cushion support device secured upon the bottom of the body section of each of said hydro-aeroplane members and said ship.

In testimony whereof I affix my signature.

MARTIN JELALIAN.